(12) United States Patent
Saraceno

(10) Patent No.: US 6,863,827 B2
(45) Date of Patent: Mar. 8, 2005

(54) SOLAR POWERED PORTABLE WATER PURIFIER

(76) Inventor: Daniel Saraceno, 1105 SW. 13th Dr., Boca Raton, FL (US) 33486

( * ) Notice: Subject to any disclaimer, the term of this patent is extended or adjusted under 35 U.S.C. 154(b) by 0 days.

(21) Appl. No.: 10/065,999

(22) Filed: Dec. 9, 2002

(65) Prior Publication Data

US 2004/0108280 A1 Jun. 10, 2004

(51) Int. Cl.⁷ .............................. C02F 1/32; C02F 9/12
(52) U.S. Cl. ......................... 210/748; 210/85; 210/241
(58) Field of Search ........................... 210/748, 85, 205, 210/202, 203, 237, 241, 244, 259, 295; 422/24, 186.3; 250/432 R

(56) References Cited

U.S. PATENT DOCUMENTS

| | | | | |
|---|---|---|---|---|
| 5,004,535 A | * | 4/1991 | Bosko et al. | 210/90 |
| 5,106,495 A | * | 4/1992 | Hughes | 210/139 |
| 5,399,260 A | | 3/1995 | Eldredge et al. | |
| 5,445,729 A | * | 8/1995 | Monroe et al. | 210/86 |
| 5,484,538 A | * | 1/1996 | Woodward | 210/767 |
| 5,547,584 A | | 8/1996 | Capehart | |
| 6,180,003 B1 | * | 1/2001 | Reber et al. | 210/198.1 |
| 6,182,453 B1 | * | 2/2001 | Forsberg | 62/125 |
| 6,193,894 B1 | * | 2/2001 | Hollander | 210/748 |
| 6,428,694 B1 | * | 8/2002 | Brown | 210/170 |
| 6,436,283 B1 | * | 8/2002 | Duke | 210/172 |
| 6,491,811 B2 | * | 12/2002 | Conrad et al. | 210/85 |

FOREIGN PATENT DOCUMENTS

DE  29608545 U1 * 8/1996

* cited by examiner

Primary Examiner—Frank M. Lawrence
(74) Attorney, Agent, or Firm—Malin, Haley & DiMaggio, P.A.

(57) ABSTRACT

The water purification system and associated method of the present invention consists of a generally self-contained, highly maneuverable, portable water purification system. Maneuverability is enhanced by mounting a cabinet on wheels or on a cart that may be easily guided to a water supply. Power is supplied to the system in a solar cell. The power is used to operate the pump of the system and to power the purifying radiation source. The system can also be used as a portable power source in addition to its capacity as a water purifier.

21 Claims, 3 Drawing Sheets

SOLAR POWERED PORTABLE WATER PURIFIER

BACKGROUND OF THE INVENTION

1. Field of the Invention

The invention relates generally to a portable water purification system, and specifically to a self-contained, highly mobile, solar powered portable water purification system.

2. Description of Related Art

The importance of having water purification systems are especially critical in third world countries or remote areas which have concentrations of people for human survival. Numerous different types of water purification systems have been devised which include chemicals such as chlorine, ozone and filters to make the water consumable by human beings. Mobile water filtration and chlorination systems are known in the prior art. U.S. Pat. No. 5,399,260 issued to Eldredge, et al. shows a field portable water purification system. This system uses a diesel engine to transport and draw water from a source through the filtration system into some sort of container. U.S. Pat. No. 5,547,584 issued to Capehart shows a transportable self-contained water purification system. Some of the drawbacks of the prior art units are that they require diesel fuel for diesel motors and the use of a combustion engine as a power source adds to the overall weight of the unit decreasing its mobility especially in remote areas. In remote regions and especially in some third world countries even getting fuel for combustion engines is a difficult process.

The present invention overcomes problems with the prior art by providing a highly mobile water purification system that includes a self-contained power supply that provides for solar power to an electrical battery that powers an electrical motor that is used for the pumping action in the purification process. The system also includes ultraviolet radiation for purification in addition to a plurality of filters that remove different undesirable particulates from the water supply. The system is highly mobile by a single person and can be directed in remote areas through woods and other type areas. The system may also provide additional energy from its solar cells to other equipment if necessary.

SUMMARY OF INVENTION

A self-contained, highly mobile, compact and relatively light weight portable water purification system for remote geographical areas that lack a power supply comprising a rigid cabinet the exterior of the cabinet covered with solar cells, a first inlet pipe for receiving contaminated water, a pump mounted inside said cabinet, a plurality of water filters connected together serially to perform filtration on the pumped water, an ultraviolet radiation chamber that radiates ultraviolet rays into the water being purified at the final stage and an outlet pipe for receiving and dispensing purified water.

Mounted inside the cabinet is also a battery and an electrical system for providing power to the water pump and a delay circuit that allows the ultraviolet radiation unit to warm up for approximately ten seconds before the pump is turned on. The exterior of the housing may be made of a any material including but not limited to plastic or metal and has mounted on the exterior surfaces (to cover as much surface area as possible) a plurality of solar cells or solar panels containing cells each of which generate electricity when subjected to sun light and which provide the electricity to the storage battery (which is typically a 12 volt battery). An inverter may be used to provide a 120 volt A/C current to the pump or to an electrical receptacle mounted on the exterior of the housing to receive an electric plug to power accessory equipment. In areas of high sun light, the system may also be used as an electrical supply source when sufficient electrical power is available for purification.

Attached to the cabinet is at least one axle with two large wheels or a plurality of wheels depending on the type of environment anticipated. A manual handle bar that is removable, collapsible and telescopic is attached to the upper portion or side of the cabinet to allow the device to be manually wheeled in any desired direction. By using the exterior cabinet surfaces, additional solar cells can be added and disposed and panels could be mechanically hinged to the device to provide for additional solar power under certain circumstances, in areas of low sun light.

In using the invention, the entire device is manually wheeled to a suitable area that has a polluted water supply that is typically fresh water and not salt water. A hose is disposed in the polluted water supply. The power switch is turned on. The pump turn on is delayed about ten seconds to allow the ultraviolet radiation unit to get up to full power in the UV chamber. A series of water filters and strainers are provided in a conduit path of the water supply to be purified mounted inside the housing for multiple stages such as first stage filter, a second stage filter and a third stage filter. The inlet water is carried in a plastic PVC pipe from the inlet hose to the outlet hose through each filter and the UV chamber for ultraviolet radiation for killing bacteria. The amount of gallons per minute is a function of the diameter of the pipe, the size of the pump and the amount of time of transition desired the filters and through the UV chamber.

It is an object of this invention to provide a highly mobile, solar powered fresh water purification system especially for use in remote and urban areas.

It is another object of this invention to provide;a highly mobile solar powered water purification system that can also provide additional electrical power from solar energy in remote areas in addition to the water purification.

Any yet still another object of this invention is to provide a highly efficient self-contained water purification system that can be easily maneuvered in remote and urban areas that does not require petroleum fuel sources for energy.

In accordance with these and other objects which will become apparent hereinafter, the instant invention will now be described with particular reference to the accompanying drawings.

DETAILED DESCRIPTION

Figure 1:
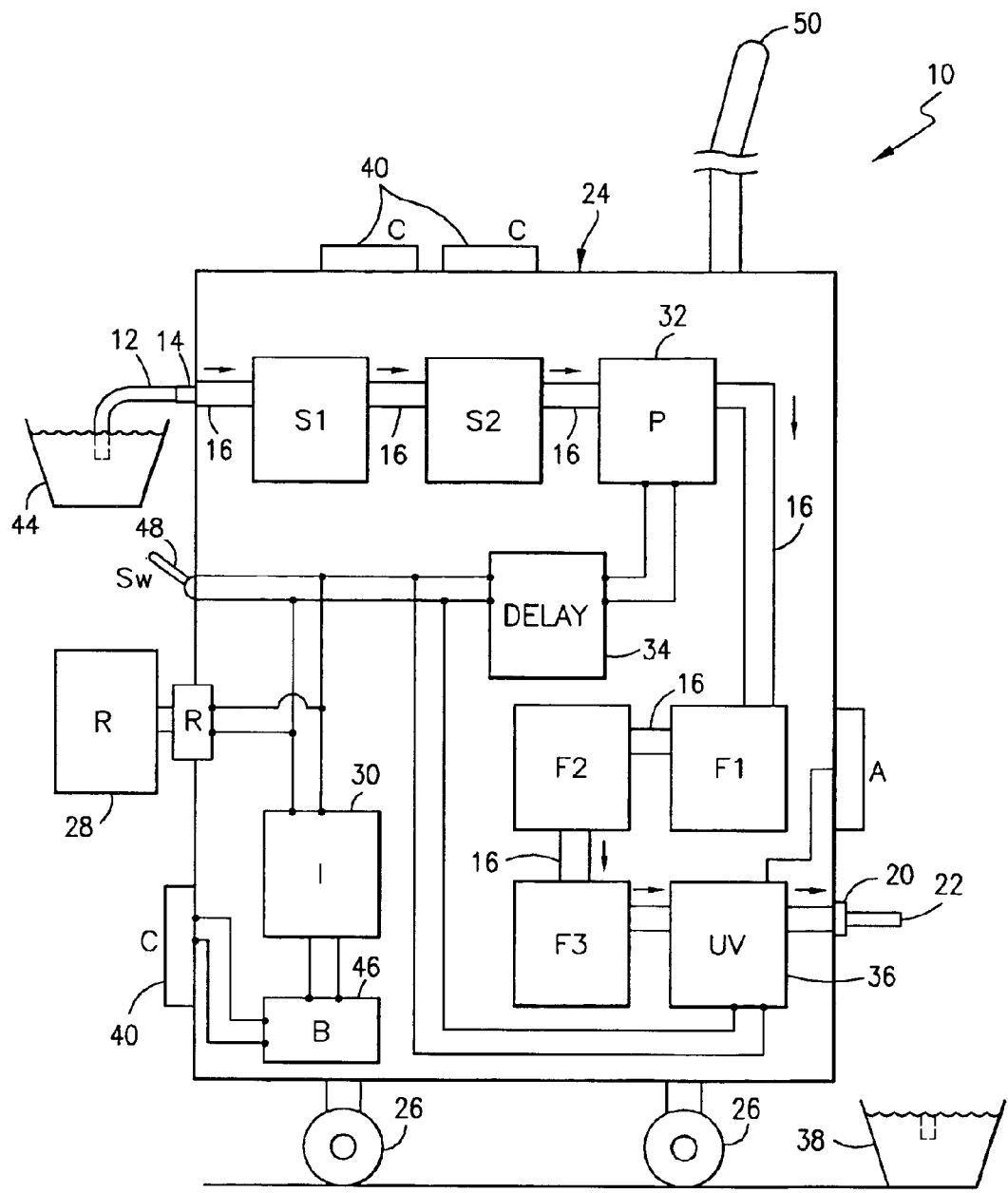
FIG. 1 shows a schematic diagram of the present invention including the purification system mounted inside a mobile cabinet.

Referring now to the drawings and especially FIG. 1, the present invention is shown schematically mounted in a housing 24 that contains strainers S1 and S2 connected together by the inlet pipe 16. An inlet hose 12 draws water from a source 44 that is polluted, that is fresh water but not drinkable by human beings for various pollution problems. The inlet hose 12 is connected to a fitting 14 that allows the water to flow into pipe 16 within the cabinet 24. A pre-strainer S1 removes the particulates from the inlet water. An additional strainer S2 can be used connected to pipe 16 as the water flows from pre-strainer S1 into strainer S2. The source of the flow energy for the water is a pump P 32 that draws the water from the inlet hose 12 from source 44 through the entire cabinet 24 as described. The pump draws the water from the source 44 at a pressure of about 40 psi or greater. The pump P is an electrical pump powered by a battery 46B connected electrically to on/off switch 48 SW. The battery power 46 goes through an inverter 30 that can be used to convert DC to a 110 volt A/C system. A pump delay element 34 allows the ultraviolet radiation to "warm up" to full power in the ultraviolet chamber 36 that contains an ultraviolet radiation source that destroys bacteria in the water by radiation. By having a ten second delay ensures that water contained in chamber 36 will be purified through the ultraviolet radiation. Once the pump 32 is running, water from screen 52 goes through the pump 32 into a first filter F1. The first stage filter F1 removes particles down to one micron in size. This removes any water borne cysts. The water then under pressure leaves the first stage filter and enters filter F2 which will filter particulates down to 0.35 microns. This stage cleans most of the turbidity or dirt and anything else that may get past stage F1. As the water leaves the filter F2, it enters filter F3 which is solid or granular carbon filter. The filter F3 polishes the water to a crystal clear state. It can also sweeten the water for better taste. The carbon blocked filter F3 removes chlorine and most organic chemicals and lead. The water then leaves the carbon filter F3 and enters the fourth stage which is a UV chamber 36. Water in the reactor chamber 36 receives the ultraviolet rays which kills all living organisms by the DNA exposure to ultraviolet rays within chamber 36. As water exits the UV chamber 36, it is now pure in the sense that it is safe for human beings to drink the water. Other filters can be added to remove specific impurities that are unique to other areas of the world. A bulk head fitting 20 connected to pipe 16 is in fluid communication with the exit pipe 22 which can deposit water into a receptacle 38 either directly or indirectly to collect the purified water.

Note also that the battery 46 is connected to a solar cell C40 which can have numerous solar cells C40 disposed all over the outside of the cabinet connected by wires to the battery or directly to the pump wiring. This allows for maximum solar charging of the battery B. The inverter 30 is used to convert 12 volt battery power current into 120 volt AC when necessary. This could provide receptacle 28 (which is an external electrical receptacle) to provide additional power to other accessory machinery in a remote location if there is excess battery power available. The receptacle also allows for A/C power to be plugged into the unit if it were available in an urban location to charge the battery and to drive the pump 32 from a 110 volt source if available.

The power control is comprised of the on/off source 48 SW which is the AC/DC power switch, a pump time delay (which can be ten seconds or more) 34 to hold the pump off until the ultraviolet light comes up to full power in the chamber 36. The water passing through the ultraviolet chamber 36 assumes a 99.9% kill rate of bacteria. A relay can be used with inverter 30 to block out the power being provided from two different power sources external and battery if available. The system may include an indicator light and an alarm A to alert problems with the ultraviolet radiation unit. The alarm A is mounted on the outside of the cabinet and connected electrically to UV unit in chamber 36.

Figure 2:
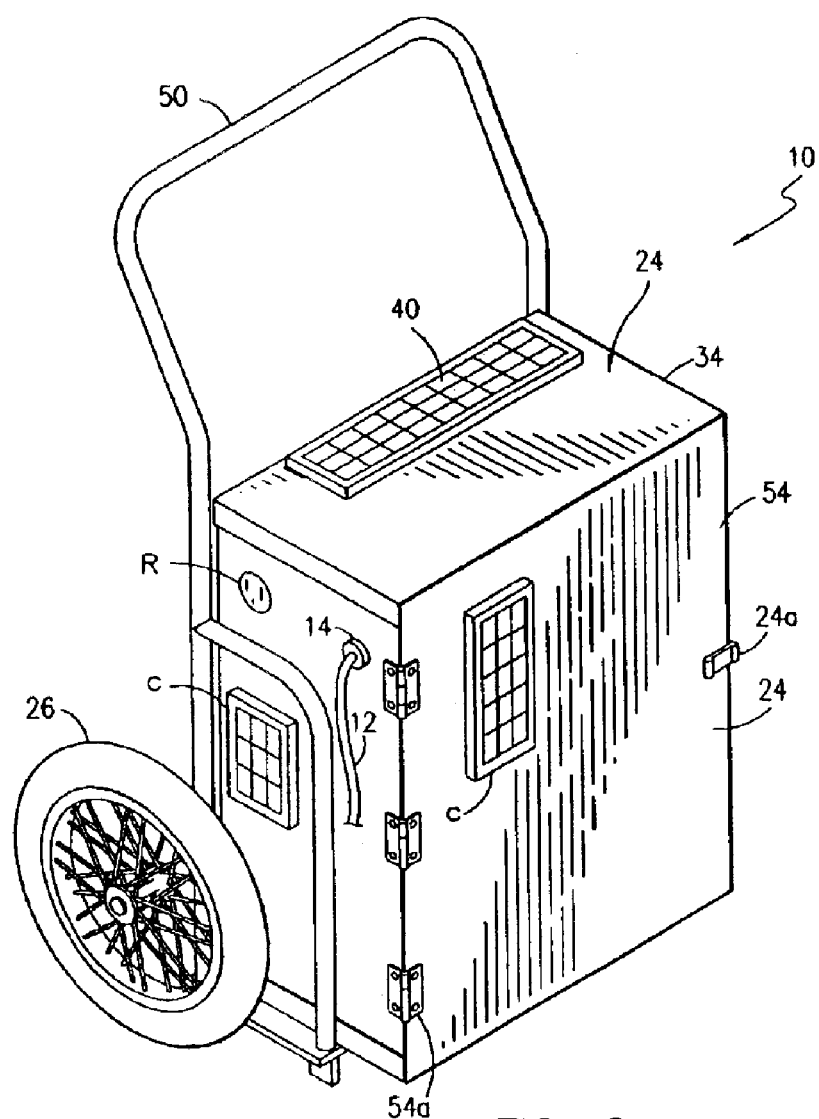
FIG. 2 shows a perspective view of the present invention.

Referring now to FIG. 2, the outside cabinet or housing 24 of the portable water purifier system is shown. The housing 21 is made of any suitable rectangular material and may have an access door 54 with hinges 54a. A handle bar 50 is connected to the housing that allows maneuvering the cabinet 24 which is connected to wheels 26 on each side. The handle bar 50 may fold down or be removable or telescopic.

The solar cells C40 are mounted on five or six surfaces of the housing for increased solar power collection to capture as much solar energy as possible, useful in urban or remote locations. Thus each side and end panel that makes up housing 24 can include additional solar cells 40 which are electrically connected to the battery for charging the battery when not in use.

Figure 3:
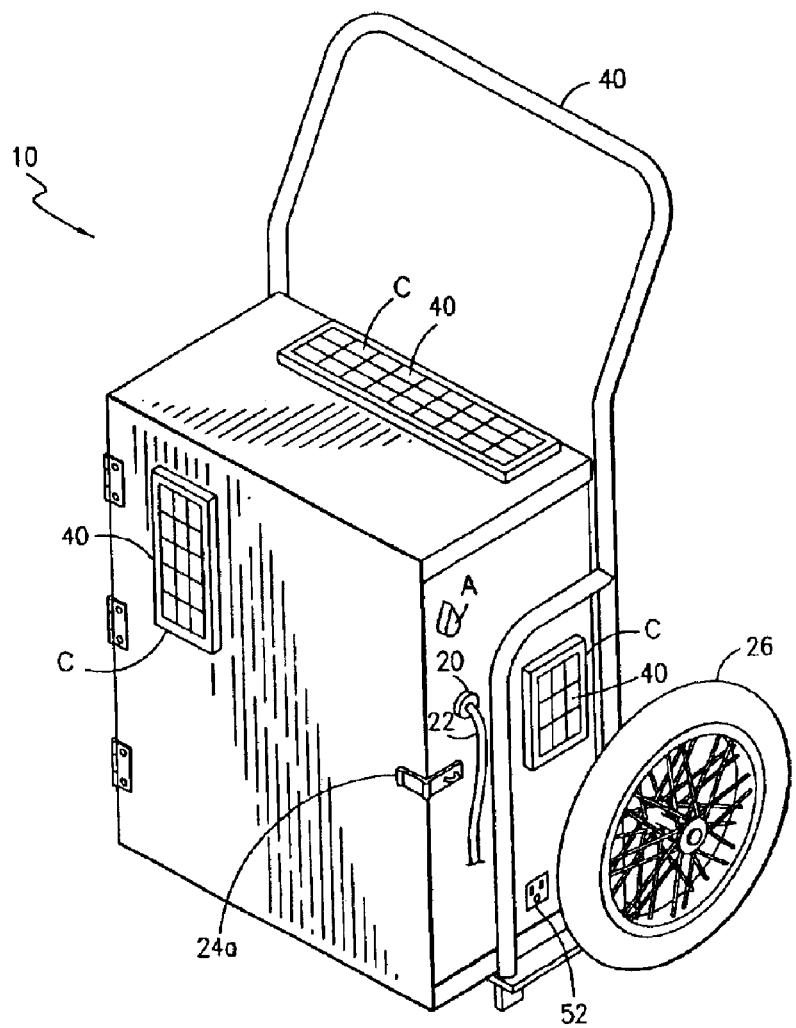
FIG. 3 shows a perspective view of the present invention.

FIG. 3 shows portable purifier 10 and housing 24 on the purified water outlet side. The outlet hose 22 is a source of purified water under pressure for use with a water container. Additional solar panels C40 can be used. An alarm that can be used to warn of any problems with the ultraviolet.

Using the present invention drinkable, portable water can be obtained from any fresh water source regardless of how polluted in any remote region that has even a moderate amount of sun light through the use of the solar cells that collect solar energy to charge a battery. The mobile unit can also be easily maneuvered with two large wheels as shown or additional wheels if required for any type of terrain. The wheels can be solid material such as rubber, tubeless or tube containing tires. The unit is easy to maneuver manually because of its light weight since it does not have a huge, heavy internal combustion engine typically found on other water purification systems.

In the electrical wiring of the system if an external power source is available, a relay locks out one of the two voltage power sources from being on together that could cause a short.

There is also the option of mounting a battery charger on board to speed up the battery recharge cycle if needed. In addition the system may be used as a portable power source to run accessories such as a light, radio, tv, or power tools.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A portable, highly maneuverable, water purification system, comprising:

a mobile cabinet having a water purification system including:

a water conduit, where the water conduit retrieves water from an unpurified water supply and transfers water through the water purification system;

a plurality of filters connected by said conduit, where the conduit and plurality of filters creates a continuous water flow from an entry cavity to an exit cavity of the purification system;

at least one ultraviolet (UV) light source located within the cabinet downstream from the filters connected to said conduit;

solar power source;

a pump connected to said conduit and said solar power source; and a time delay mechanism where the time delay mechanism delays the functioning of the pump for a predetermined time period.

2. The system of claim 1, wherein the plurality of filters includes at least one screen filter for screening solid larger particulates in the water.

3. The system of claim 2, wherein the plurality of filters includes a carbon filter located downstream from the screen filter.

4. The system of claim 1, further comprising:
a supply hose; and
a pre-strainer of the water to be purified located between the supply hose and an ingress.

5. The system of claim 1, further comprising a battery power supply located within the cabinet.

6. The system of claim 5, wherein power to the pump is supplied after power is supplied to the UV light.

7. The system of claim 6, wherein the pump brings the water to be purified to at least approximately 40 psi of head pressure.

8. The system of claim 5, further comprising a power receptacle for providing electrical power located outside the cabinet.

9. The system of claim 5, further comprising a solar cell in electronic communication with the power supply.

10. The system of claim 5, wherein the power supply is adaptable to electronic communication with an outside power source.

11. The system of claim 5, further comprising a malfunction indicator for the UV light.

12. The system of claim 1, further comprising:
wheels for rolling the system, and
a handle mechanism for directing the cabinet.

13. The system of claim 1, wherein the interior of the cabinet is protected with a closeable mechanism.

14. A portable, highly maneuverable apparatus for purifying water, comprising:
cabinet means for receiving water to be purified, including;
means for filtering the water located inside the cabinet means;
means for exposing the water to purifying radiation located within the cabinet downstream from the means for filtering;
pump means powered by solar power;
a time delay means, where the time delay means delays the functioning of the pump means for a predetermined period; and
a continuous water flow means, where the water flow means retrieves water from an unpurified water supply and transfers water through the water purification system.

15. The apparatus of claim 14, further comprising:
means for supplying water to the cabinet means; and
means for supplying power to means for supplying water located within the cabinet means.

16. The apparatus of claim 15, further comprising means for supplying power to the means for exposing the water to purifying radiation.

17. The apparatus of claim 15, further comprising a means for obtaining solar power for charging the means for supplying power.

18. The apparatus of claim 14, further comprising wheels for rolling the system; and
a handle mechanism for directing the cabinet.

19. A method of purifying water within a portable, highly maneuverable cabinet system, comprising the steps of:
providing a portable, highly maneuverable cabinet for the purification of water;
placing a series of filters within the cabinet;
activating a pump within the cabinet;
delaying the step of activating a pump for a predetermined period of time;
retrieving unpurified water via an inlet hose attached to the cabinet;
continuously transferring the unpurified water through the series of filters;
exposing the unpurified water to at least one ultraviolet (UV) light source located within the cabinet downstream from the filtering step, where step of exposing creates purified water;
immediately transferring the purified water out of the cabinet via an outlet pipe; and
using solar power to supply energy to the cabinet.

20. The method of claim 19, wherein the cabinet includes a solar power supply and battery.

21. The method of claim 20, wherein the cabinet is capable of operating as a portable power source.

* * * * *